United States Patent
Esche et al.

(10) Patent No.: US 7,934,520 B2
(45) Date of Patent: May 3, 2011

(54) COUPLING ASSEMBLY FOR PLUMBING FITTING

(75) Inventors: John C. Esche, Kohler, WI (US); William R. Bares, Fredonia, WI (US)

(73) Assignee: Kohler Co., Kohler, WI (US)

( * ) Notice: Subject to any disclaimer, the term of this patent is extended or adjusted under 35 U.S.C. 154(b) by 582 days.

(21) Appl. No.: 12/116,326

(22) Filed: May 7, 2008

(65) Prior Publication Data

US 2008/0277611 A1    Nov. 13, 2008

Related U.S. Application Data

(60) Provisional application No. 60/916,736, filed on May 8, 2007.

(51) Int. Cl.
*F16K 21/00* (2006.01)
(52) U.S. Cl. .................. 137/801; 137/597; 137/606
(58) Field of Classification Search .............. 137/597, 137/603, 606, 801; 4/675–678
See application file for complete search history.

(56) References Cited

U.S. PATENT DOCUMENTS

| | | | |
|---|---|---|---|
| 975,663 A | 11/1910 | Watrous | |
| 1,725,987 A | 5/1926 | Kersten | |
| 2,256,419 A | 9/1941 | Tinnerman | |
| 2,949,933 A * | 8/1960 | Moen | 137/625.17 |
| 4,593,430 A | 6/1986 | Spangler et al. | |
| 4,973,025 A | 11/1990 | Iqbal | |
| 5,458,154 A * | 10/1995 | Niemann et al. | 137/801 |
| 5,464,045 A * | 11/1995 | Niemann et al. | 137/801 |
| 5,947,149 A | 9/1999 | Mark | |
| 6,363,961 B1 * | 4/2002 | Wang | 137/119.05 |
| 6,378,912 B1 | 4/2002 | Condon et al. | |
| 6,438,771 B1 | 8/2002 | Donath et al. | |
| 7,096,879 B2 | 8/2006 | Yardley | |
| 7,104,473 B2 | 9/2006 | Bosio | |
| 2004/0011399 A1 | 1/2004 | Segien, Jr. | |

FOREIGN PATENT DOCUMENTS

| | | |
|---|---|---|
| DE | 523736 | 4/1931 |
| DE | 10243305 A1 | 3/2004 |
| EP | 1004710 A2 | 5/2000 |
| EP | 1507044 A2 | 2/2005 |

(Continued)

OTHER PUBLICATIONS

PCT/US2008/005829; International Search Report and Written Opinion; 24 pages.

(Continued)

*Primary Examiner* — Craig M Schneider
(74) *Attorney, Agent, or Firm* — Quarles & Brady LLP

(57) ABSTRACT

A control handle assembly for a plumbing fitting has a first control member having a bore and a ledge within the bore extending radially inward to an inner dimension, and a second control member having a mounting post with a ledge extending radially outward to an outer dimension. A deformable clip is captured by the control members between the ledges and has a radial outer dimension greater than the inner and outer dimensions of the ledges so as to rotatably couple the control members.

A spout coupling assembly has a lower adaptor defining a lower passageway for housing a diverter and an upper adaptor coupled to the lower adaptor defining an upper passageway. An annular recess is formed in the upper adaptor and a collar is axially restrained in the annular recess. A spout is coupled to the collar so that the spout and collar rotate simultaneously.

6 Claims, 7 Drawing Sheets

FOREIGN PATENT DOCUMENTS

| | | |
|---|---|---|
| EP | 1715231 A1 | 10/2006 |
| GB | 1093492 | 12/1967 |
| GB | 1337486 | 11/1973 |
| GB | 2394525 A | 4/2004 |
| WO | WO2004007854 A1 | 1/2004 |

OTHER PUBLICATIONS

PCT/US2008/005829; Invitation to Pay Additional Fees and Partial International Search Report; 5 pages.

* cited by examiner

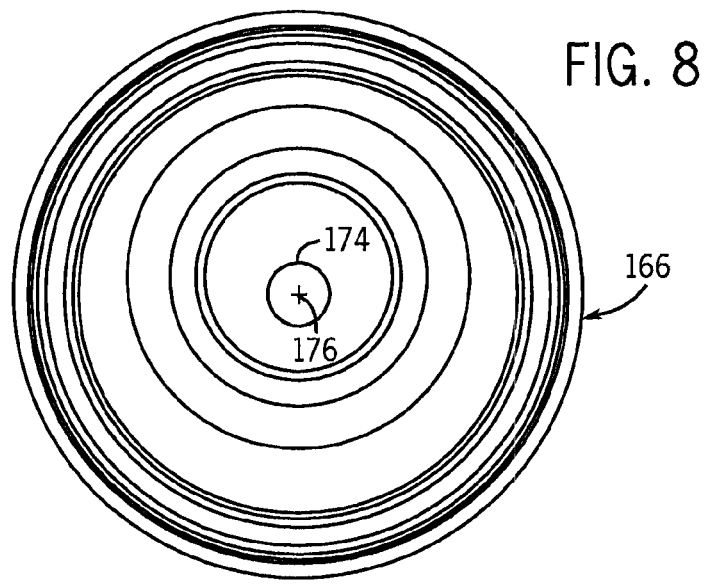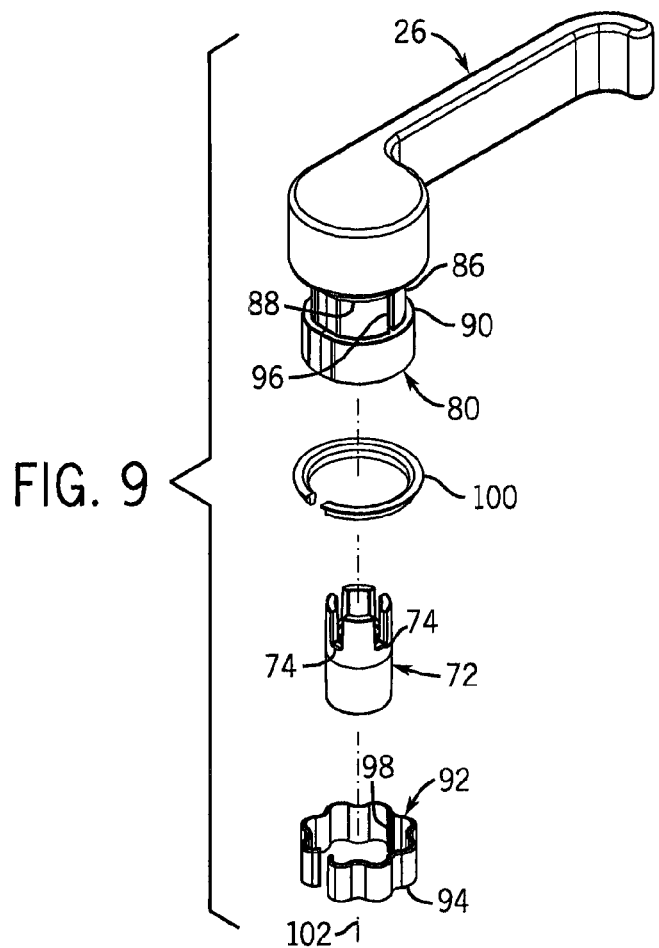

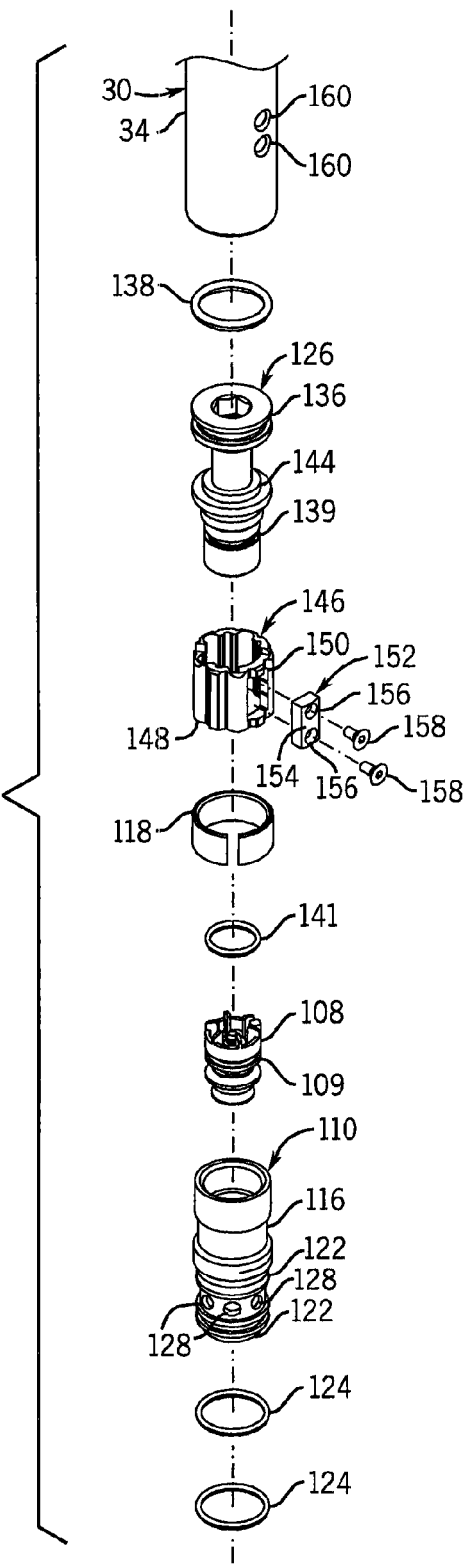

COUPLING ASSEMBLY FOR PLUMBING FITTING

CROSS-REFERENCE TO RELATED APPLICATIONS

This application claims priority to U.S. provisional application No. 60/916,736 filed May 8, 2007, which is hereby incorporated by reference as if fully set forth herein.

STATEMENT OF FEDERALLY SPONSORED RESEARCH OR DEVELOPMENT

Not applicable.

BACKGROUND OF THE INVENTION

The present invention relates to a plumbing fittings and fixtures. More particularly, it relates to coupling arrangements for plumbing products such as faucets and the like.

Nearly all plumbing fixtures incorporate some type of fitting allowing a user to adjust such features as the volume of fluid flow, the fluid temperature, the particular path the fluid takes, to what outlet the fluid flows, and the like. To provide this control, a control handle is typically coupled to a valve (e.g., a mixing valve, gate valve, butterfly valve, ball valve, etc.). The control handle and valve are often coupled by a fastener, such as a set screw, extending through a portion of the control handle and into the valve, thus capturing the handle to the valve. To improve the appearance, the fastener is hidden under a decorative cover or plug. The use of a fastener has the advantage of making installation and removal of the handle a straightforward, repeatable task. The control handles, however, are limited in shape, size, and configuration due to the required fastener access, and the covers and plugs used to hide the fasteners are prone to breaking during removal and reassembly.

Many plumbing fixtures, especially those used in kitchens, incorporate a diverter for rerouting flow from an outlet of a spout to another remote outlet, such as a spray nozzle. Incorporating the diverter into the spout typically results in a bulky spout coupling having a large nut or knurled coupler and an unstable fit between the spout and the balance of the faucet. The coupling is even more pronounced when the spout is made to pivot.

Thus, a need exists for better ways to couple handles, spouts, etc. in plumbing fittings.

SUMMARY OF THE INVENTION

In one aspect, the present invention provides a control handle assembly devoid of any exposed or clearly visible coupling components. The invention provides a control handle assembly for a plumbing fitting including a first control member having a bore and a first ledge within the bore extending radially inward to an inner dimension, and a second control member having a mounting post with a second ledge extending radially outward to an outer dimension. A clip is captured by the first and second control members between the first and second ledges. The clip is deformable and has a radial outer dimension greater than each of the inner dimension of the first ledge and the outer dimension of the second ledge so as to rotatably couple the first and second control members.

In another aspect, the present invention provides a diverter coupling assembly in which a diverter is housed in a lower adaptor and axially restrained by an upper adaptor coupled to the lower adaptor. The invention provides a diverter coupling assembly, comprising a lower adaptor defining a lower passageway for housing a diverter and an upper adaptor coupled to the lower adaptor defining an upper passageway in fluid communication with the lower passageway, wherein the upper adaptor axially restrains the diverter in the lower passageway.

In a further aspect, the present invention provides a spout coupling assembly in which a spout is coupled to a collar that is restrained in a recess of an adaptor. The invention provides a spout coupling assembly, comprising an adaptor defining a passageway from an inlet to an outlet, an exterior recess formed in the adaptor, a collar axially restrained in the exterior recess of the adaptor, and a spout coupled to the collar so that the spout and collar rotate substantially simultaneously.

In yet another aspect, the present invention provides a spout coupling assembly having a lower adaptor coupled to an upper adaptor capturing a diverter and a spout coupled to a collar that is restrained in an annular recess of the upper adaptor, allowing the spout and collar to swivel simultaneously. The present invention provides a spout coupling assembly, comprising a lower adaptor defining a lower passageway in fluid communication with a fluid supply for housing a diverter, an upper adaptor coupled to the lower adaptor defining an upper passageway in fluid communication with the lower passageway and a fluid outlet, an annular recess formed in the upper adaptor, a collar axially restrained in the annular recess of the upper adaptor, and a spout coupled to the collar so that the spout and collar rotate substantially in unison.

These and other advantages of the invention will be apparent from the detailed description and drawings. What follows are one or more example embodiments of the present invention. To assess the full scope of the invention the claims should be looked to, as the example embodiments are not intended as the only embodiments within the scope of the invention.

BRIEF DESCRIPTION OF THE DRAWINGS

FIG. 8 is a partial rear view of the faucet shown in FIG. 6 taken along line 8-8 of FIG. 7;

FIG. 9 is a partial exploded view of the faucet shown in FIGS. 1 and 6; and FIG. 10 is a partial exploded view of the faucet shown in FIGS. 1 and 6.

DETAILED DESCRIPTION OF THE EXAMPLE EMBODIMENTS

The example embodiments are described with reference to a type of faucet commonly referred to as a "bridge faucet" (i.e., a faucet including a pair of spaced apart handles connected by an intermediate bridge). While the invention is described with reference to this type faucet, the invention is equally applicable to other types of plumbing fixtures, such as, widespread and single-hole faucets, and other application settings, such as, bath tubs and shower stalls.

Figure 1:
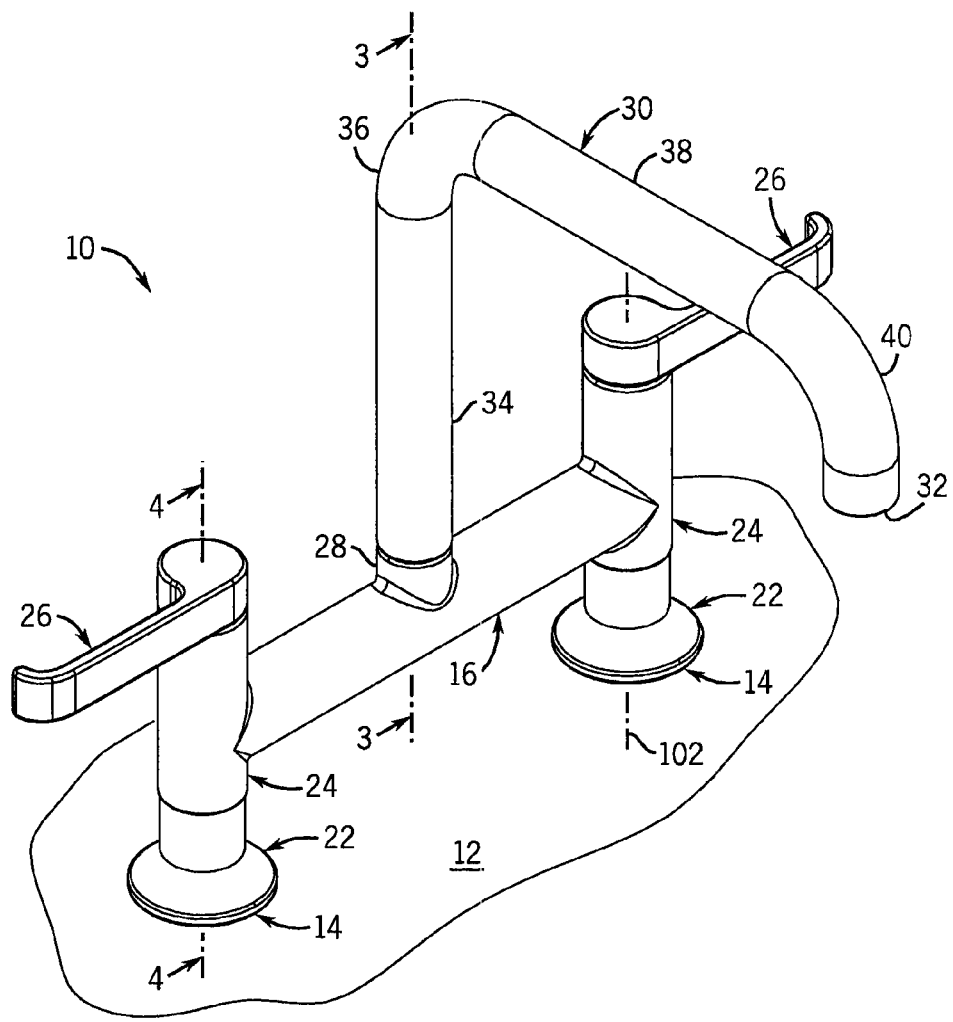
FIG. 1 is a perspective view of a deck mounted bridge faucet in accordance with an example embodiment of the invention.

Turning first to FIG. 1, a deck mounted bridge faucet 10 is shown mounted to a substrate 12, such as a counter, tub surround, and the like. The faucet 10 includes a pair of spaced apart pillar assemblies 14 in fluid communication with a horizontal bridge 16. One of the pillar assemblies 14 is typically coupled to a hot water supply line 18 and the other to a cold water supply line 20 (shown in FIG. 2). Each pillar assembly 14 includes an escutcheon 22, a valve housing 24, and a handle 26. The bridge 16 connecting the pillar assemblies 14 has a centrally located spout port 28 coupled to a spout 30 that terminates at an outlet 32. The spout 30 has a vertical neck 34 leading from the spout port 28 to a first elbow 36. The first elbow 36 leads to a horizontal extension 38 that terminates in a second elbow 40 coupled to a nozzle 42.

Figure 2:
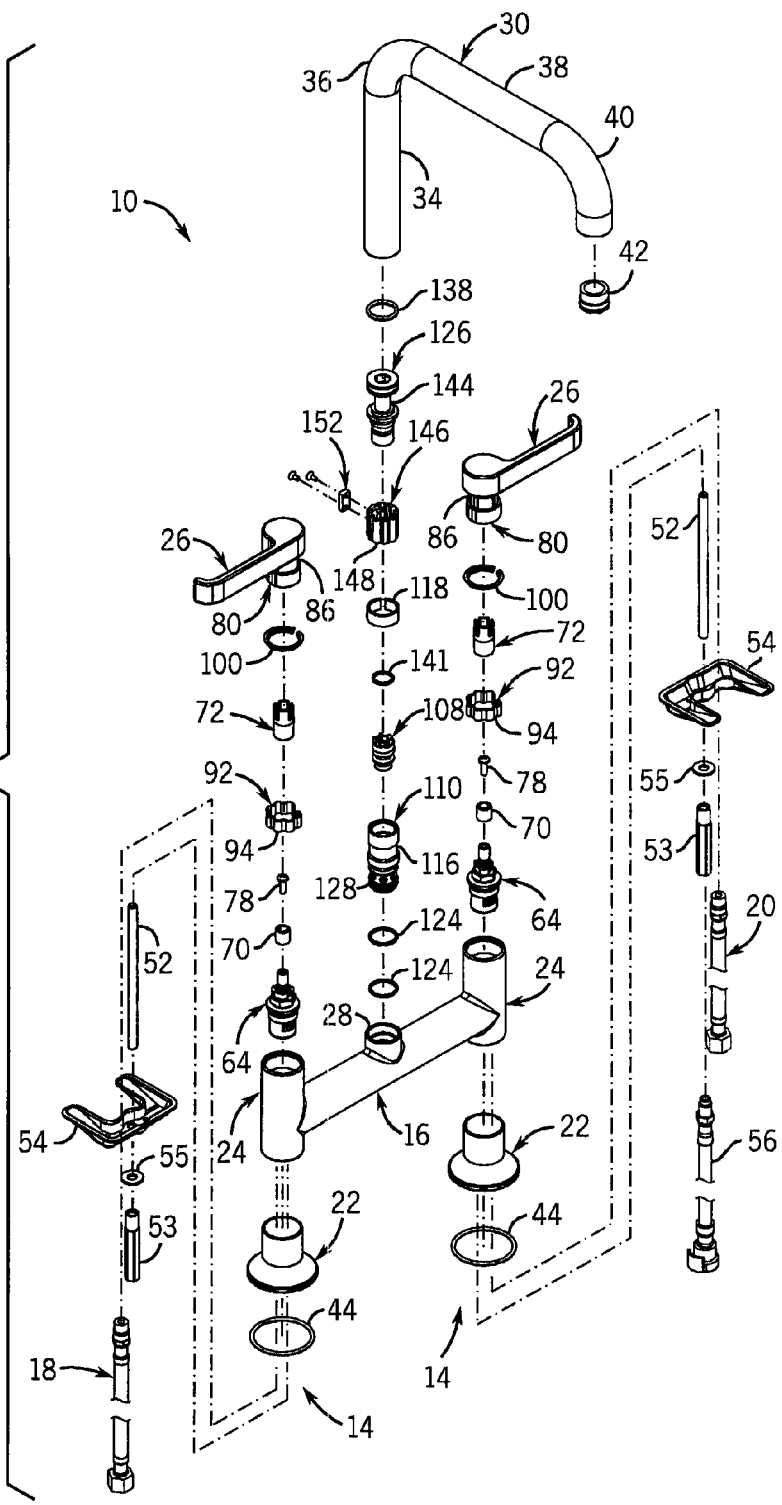
FIG. 2 is an exploded view of the faucet shown in FIG. 1.

Turning generally to FIG. 2, the internal components of the faucet 10 are shown. We begin with the pillar assemblies 14, followed by the spout 30 and associated components. It is of note that each pillar assembly 14 in the example embodiment is substantially similar to the other, meaning the components, while perhaps having a different relative orientation, are identical. The exception being that the handles 26 are location specific (i.e., the left handle 26 mirrors the right handle 26).

Beginning at the substrate 12, an o-ring 44 is fitted in a recess 46 formed in the back face 48 of the escutcheon 22 (more clearly shown in FIG. 4) and sandwiched between the substrate 12 and recess 46. The escutcheon 22 of the first example embodiment (illustrated in cross-section in FIG. 4) has a central bore 50 receiving the hot water supply 18 or cold water supply 20, depending on the application. A mounting post 52 passes through the escutcheon 22 and threads into the valve housing 24 via nut 53 and accompanying washer 55 to secure the pillar assembly 14 to the substrate 12 in connection with a mounting plate 54 adjacent the underside of the substrate 12. A remote spray nozzle (not shown) may be attached to the remote outlet line 56 for supplying fluid to the remote spray nozzle.

Figure 4:
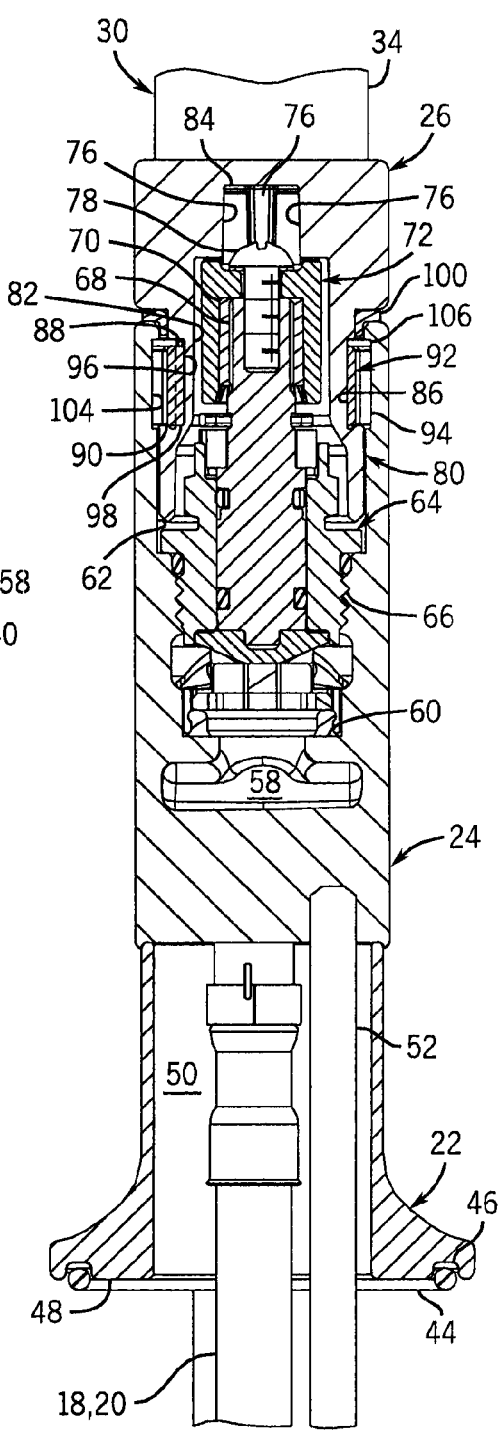
FIG. 4 is a partial section view of the faucet shown in FIG. 1 taken along line 4-4 of FIG. 1.

Continuing upwardly along the faucet 10, and with additional reference to FIGS. 4 and 9, the valve housing 24 includes a fluid reservoir 58 located beneath an annular valve seat 60. A cylindrical bore 62 extends into the valve housing 24 and is configured to receive a valve cartridge 64 via mating threads 66.

The valve cartridge 64 is ultimately operated by rotating the handle 26. To achieve this, a knurled valve stem 68 is capped by a larger knurled valve stem adaptor 70. The larger valve stem adaptor 70 is then covered by a stem extension 72 having a knurled bore engaging the valve stem adaptor 70. The stem extension 72 includes a series of slots 74 formed therein (shown more clearly in FIG. 9) for engaging mating tabs 76 in the handle 26 (described below). A fastener 78, here a screw, is then threaded into the valve stem 68 to capture the stem adaptor 70 and stem extension 72 to the valve cartridge 64. It is of note that the stem adaptor 70 and stem extension 72 could be integral with one another. Additionally, the stem adaptor 70 and stem extension 72 are preferably molded from plastic but may be produced form metal or made integral with the valve stem 68.

The handle 26 includes a cylindrical mounting post 80 for engaging and operating the valve cartridge 64 and for allowing the handle 26 to be releasably attached axially to the valve housing 24. The mounting post 80 includes an internal bore 82 from which a series of tabs 76 extend downwardly from the upper end 84 to mesh with the slots 74 formed in the stem extension 72.

The mounting post 80 further includes an external recess 86 extending around the circumference of the mounting post 80 defining an upper ledge 88 and a lower ledge 90 having an outer diameter. A deformable, preferably plastic, split ring clip 92 having undulating, wavy sides 94 is axially restrained in the recess 86 by the upper ledge 88 and the lower ledge 90. The mounting post 80 has a vertical groove 96 (as oriented in FIG. 4 and best shown in FIG. 9) for engaging a protrusion 98 preferably located midway between the ends of the clip 92. The protrusion 98 may alternatively be located anywhere along the clip 92, including the ends of the clip 92. The protrusion 98 prevents the clip 92 from rotating about the mounting post 80 during installation of the handle 26. A c-shaped bearing 100 is also attached to the mounting post 80 to provide a bearing surface between the handle 26 and the valve housing 24 during operation.

Figure 5:
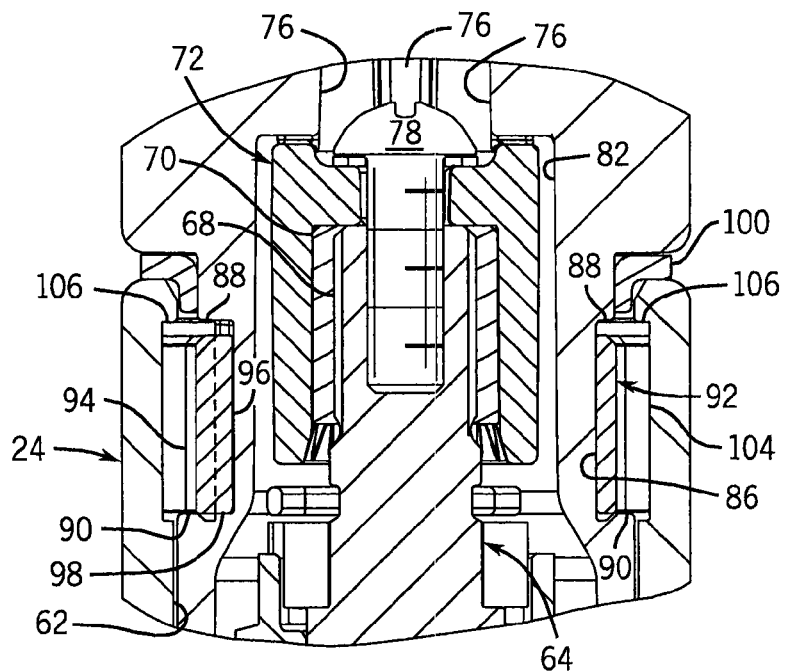
FIG. 5 is an enlarged view of the partial section view shown in FIG. 4.

The handle 26 (i.e., mounting post 80, clip 92, and bearing 100) is releaseably axially coupled to the valve housing 24 and rotatable about the axis 102. The bore 62 includes an internal recess 104 that defines an undercut ledge 106 (shown more clearly in FIG. 5) having an inner diameter for axially restraining the handle 26. To releaseably couple the valve housing 24 and the handle 26, the mounting post 80, restrained clip 92, and bearing 100 of the handle 26 are pressed into the bore 62 formed in the valve housing 24. Given that the radial outer dimension of the clip 92 is slightly larger than the inner diameter of the ledge 106 formed in the bore 62, the amplitude of undulating sides 94 deform and then decrease allowing the mounting post 80 and clip 92 to enter the bore 62. Continuing to press the handle 26 results in the clip 92 fully engaging the internal recess 104 of the bore 62. The clip 92 then springs to a less-stressed position, and extends into the internal recess 104. Attempting to remove the handle 26 from the valve housing 24 causes the clip 92 to bear against the ledge 106 defined by the recess 104 and the lower ledge 90 of the mounting post 80. Sufficient upward force will cause the clip 92 to again deform and the handle 26 to disengage the valve housing 24. As a result, the handle 26 is easily coupled and uncoupled to the valve housing 24 without the use of visible fasteners.

As the handle 26 is inserted into the valve housing 24, the tabs 76 of the handle 26 align with the mating slots 74 formed in the stem extension 72. Thus, the handle 26 rotatably engages the valve cartridge 64 allowing the handle 26 to control the flow of fluid through the valve cartridge 64.

Two additional points are of note before we turn our attention to the spout 30. First, the handle 26 is preferably die cast from zinc; however, the handle 26 may be made from any suitable material, such as stainless steel, brass, plastic, and the like. Second, while the example embodiment refers to a handle 26 and valve housing 24, the control handle assembly may be used on a variety of plumbing fittings. As a simple alternative, the handle 26 may have a bore into which a mounting post extending from the valve housing 24 extends into. The handle 26 and valve housing 24 may essentially swap roles from those described in the example embodiment and remain within the scope of the invention. As another alternative, a trip lever for flushing a toilet may include a mounting post for extending into a bore formed in the toilet tank.

Figure 3:
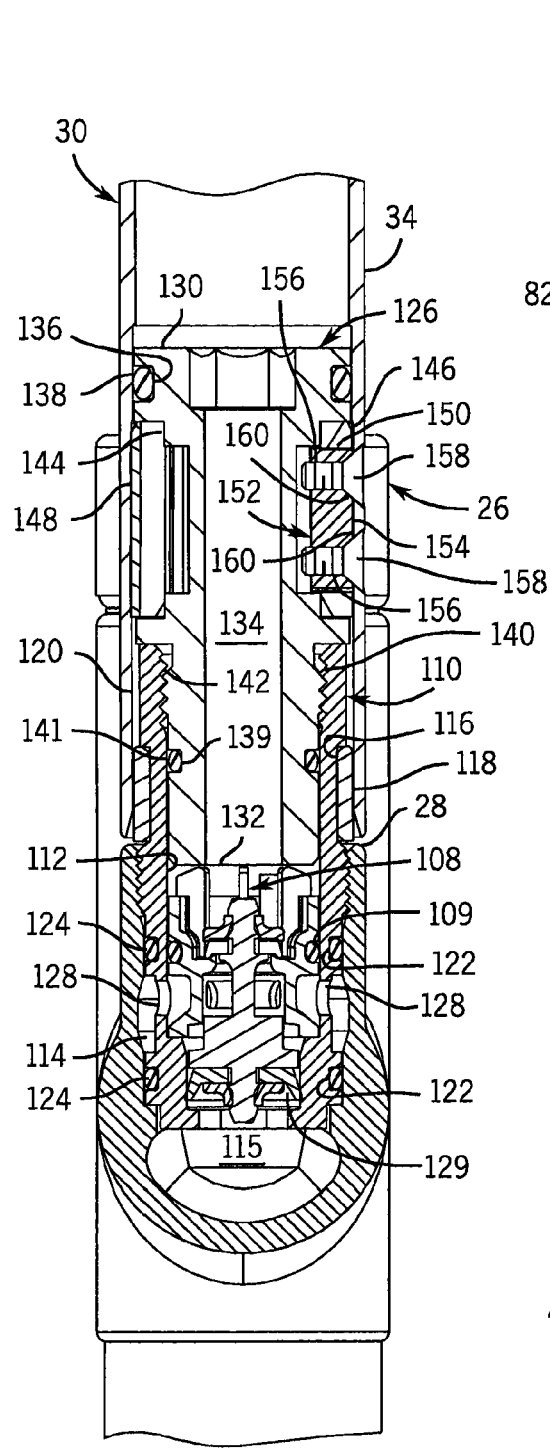
FIG. 3 is a partial section view of the faucet shown in FIG. 1 taken along line 3-3 of FIG. 1.

With reference to FIGS. 2, 3, and 10, the spout 30 includes a diverter 108 for directing flow between the spout 30 and a remote sprayer or other tube (not shown). In one position, the diverter 108 allows fluid to flow from the supply lines 18, 20 to the outlet 32. In a second position, the diverter 108 directs fluid to the remote sprayer/tube and not to the outlet 32.

The diverter 108 and sealing o-ring 109 are housed in a generally cylindrical lower adaptor 110 that is threaded into spout port 28. A pair of annular recesses 122 receive a pair of o-rings 124 for sealing the lower adaptor 110 to the spout port 28. The lower adaptor 110 defines a cylindrical lower passageway 112 extending from approximately an annular fluid inlet 114 and configured to house the diverter 108. The lower adaptor 110 includes an annular recess 116 restraining a bearing 118. The bearing 118 is configured to abut an inner surface 120 of the spout 30 when the spout 30 is slid over the lower adaptor 110. Lower diverter ports 128 are formed into the lower adaptor 110 and are incorporated as required by the particular diverter 108 and application. Lower diverter ports 128 may be circular, as best shown in FIG. 10, or may alternatively include a plurality of elongated slots and the like.

An upper adaptor 126 is a generally cylindrical tube having an upper end 130 and a lower end 132 and an upper passageway 134. When the lower adaptor 110 and upper adaptor 126 are coupled, the lower passageway 112 and the upper passageway 134 are in fluid communication allowing fluid to flow from the fluid inlet 114, through the lower diverter ports 128, through the lower passageway 112, through the upper passageway 134, and out the outlet 32. When the diverter 108 is activated, as shown in FIG. 3, fluid flows from the fluid inlet 114, through the lower diverter ports 128, past a cup seal 129, and into a remote passage 115 that runs to a remote spray nozzle (and the like) via remote outlet line 56.

The upper adaptor 126 includes a groove 136 and mating o-ring 138 to seal the upper adaptor 126 within the spout 30. An additional groove 139 and mating o-ring 141 are included to seal between the upper adaptor 126 and the lower adaptor 110. The upper adaptor 126 has external threads 140 that engage mating internal threads 142 formed in the lower passageway 112 of the lower adaptor 110. The internal and external relationships may be swapped and remain within the scope of the invention. Furthermore, other methods of coupling the lower and upper adaptors 110, 126 are available and within the scope of the invention. For example, the adaptors 110, 126 may be welded or brazed together, or the adaptors 110, 126 may be integrally formed, such as by molding. The diverter 108 may also be overmolded or molded as an insert into the adaptor 110, 126.

The second end of the upper adaptor 126 is adjacent the diverter 108, as a result, the upper adaptor 126 axially restrains the diverter 108 in the lower passageway 112. The diverter 108 is captured between the lower adaptor 110 and the upper adaptor 126. This coupling not only provides secure restraint of the diverter 108, but also provides a constant diameter spout 30 while still allowing the spout 30 to pivot in conjunction with the upper adaptor 126.

The upper adaptor 126 further includes an annular recess 144 which axially restrains a c-shaped plastic collar 146 having undulating sides 148. The collar 146 clips around the recess 144 and includes a cutout 150 for receiving a nut 152. The collar 146 is free to rotate about the upper adaptor 126, but is restrained from axial movement. The nut 152 is a rectangular box having a convex outer side 154. The outer side 154 also includes a pair of spaced apart, threaded holes 156 for receiving a pair of screws 158. The spout 30 has a pair of spaced apart holes 160 through which the screws 158 pass prior to engaging the nut 152, thus capturing the spout 30 between the nut 152 and the screws 158.

The spout 30 is capable of being rotatably coupled to the upper adaptor 126. After coupling the lower adaptor 110 and the upper adaptor 126, the collar 146 is clipped into the recess 144. The nut 152 is seated into the cutout 150 and the neck 34 is slid over the coupled lower and upper adaptors 110, 126 until the neck 34 abuts the spout port 28. The holes 160 on the spout 30 are aligned with the threaded holes 156. Finally, the screws 158 are passed through the holes 160 on the spout 30 and threaded into the holes 156 of the nut 152. As a result, the spout 30 is axially coupled to the collar 146 and hence the upper adaptor 126, lower adaptor 110, spout port 28, and faucet 10. However, the spout 30 is also free to rotate because the collar 146 to which it is coupled is free to rotate about the upper adaptor 126. It is of note that the threaded holes (or equivalent fastening means) may be integral with the collar 146 and need not be a separate component. For example, the collar 146 may contain molded threads or inserts configured to receive a screw, bolt, or other fastening device.

The lower adaptor 110, upper adaptor 126, and nut 152 are preferably machined from brass, but may be constructed from any suitable material and process, including, but not limited to, cast from aluminum or molded from plastic.

Figure 6:
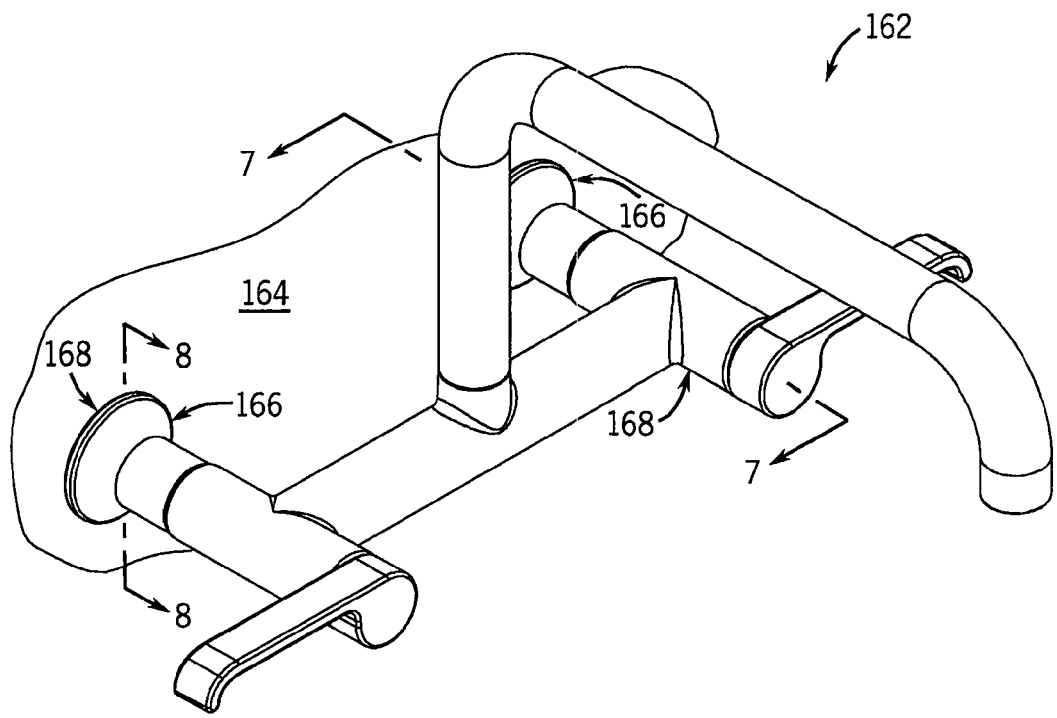
FIG. 6 is a perspective view of a wall mounted bridge faucet in accordance with an alternative example embodiment of the invention.

Turning to FIG. 6, an alternative example embodiment is shown; the present invention is equally applicable to the wall mounted bridge faucet 162. In addition to the features already described, the alternative embodiment includes an eccentric escutcheon 166 for both adjusting the positioning of the pillar assemblies 168 and establishing a uniform distance from a wall 164, or mounting substrate, to the balance of the faucet 162.

Figure 7:
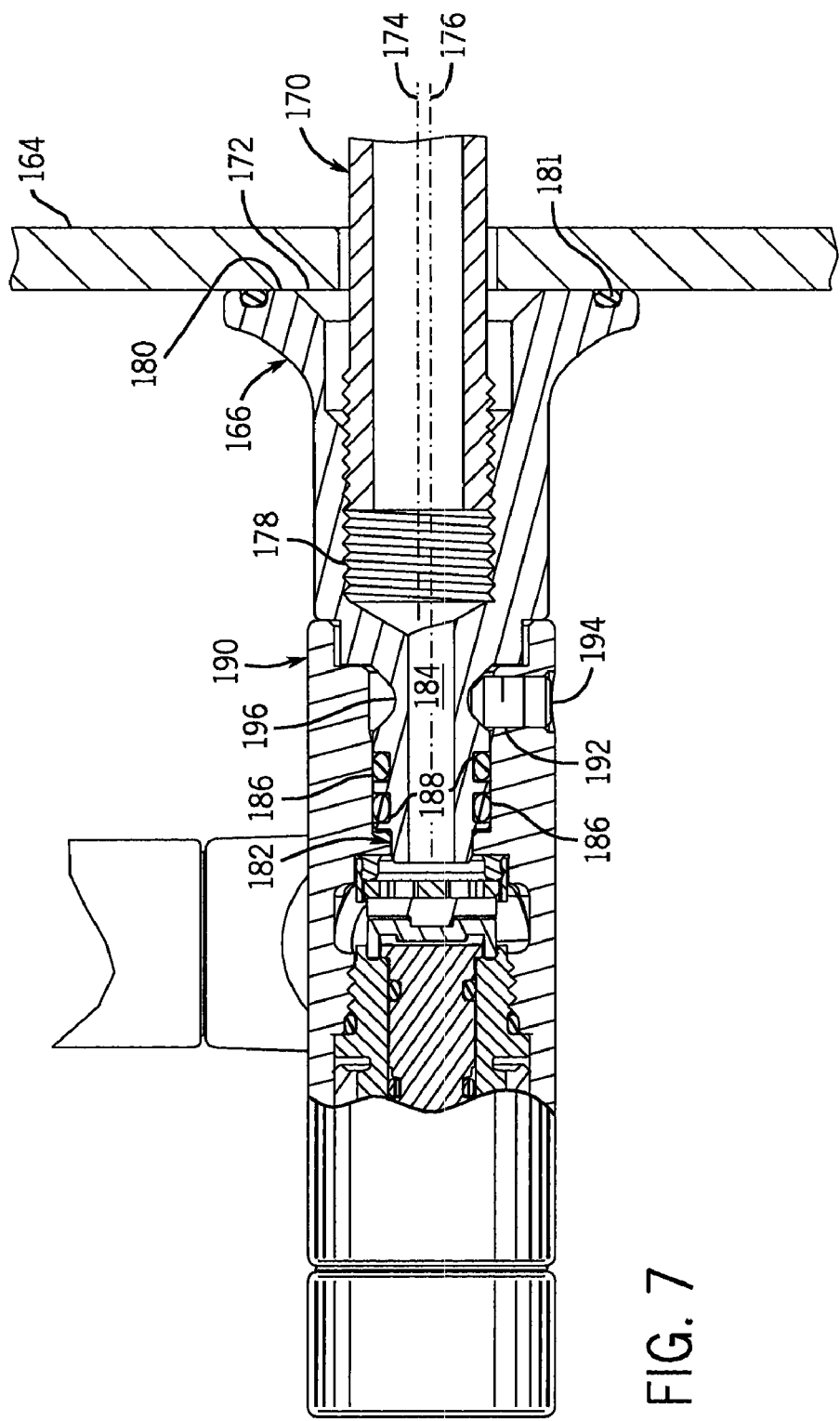
FIG. 7 is a partial section view of the faucet shown in FIG. 6 taken along line 7-7 of FIG. 6.

With reference to FIG. 7, a partially threaded supply pipe 170 protrudes from the wall 164 into a cavity 172 formed within the escutcheon 166. The supply pipe 170 is aligned with a supply pipe axis 174 that is offset parallel from a nipple axis 176 (shown as viewed from the wall in FIG. 8). The supply pipe 170 is threaded into the threaded pipe bore 178 until the back surface 180 of the escutcheon 166 and restrained o-ring 181 first engage the wall 164. This is then repeated for the other escutcheon 166 and supply pipe 170. Once both escutcheons 166 are coupled to the supply pipes 170, the distance between the escutcheons 166 and the horizontal relationship (e.g., the relative height from a fixed point) can be easily adjusted by rotating the escutcheons 166. As the escutcheon 166 rotates about the supply pipe axis 174, the nipple axis 176 marks out a circular path with the supply pipe axis 174 as the center, effectively altering the mounting position of the attached faucet 162 components. The relationship between the escutcheons 166 is altered until the desired relationship is obtained.

The escutcheon 166 includes a nipple 182 having an internal passageway 184 in fluid communication with the supply pipe 170 and the balance of the faucet 162. A pair of o-rings 186 is restrained in a pair of annular recesses 188 formed in the nipple 182. The valve housing 190 is then secured to the escutcheon 166. The valve housing 190 includes a threaded bore 192 into which a set screw 194 is threaded to engage a necked down portion 196 of the escutcheon 166. As a result of the escutcheon 166, the distance from the wall 164 to the nipple 182 will remain consistent regardless of the length of supply pipe 170 protruding form the wall 164, provided the supply pipe 170 is long enough to engage the bore 178 of the escutcheon 166 and short enough so as to not run out of threads prior to the escutcheon 166 abutting the wall 164. Thus, the appearance of the faucet 10 is consistent given various mounting conditions.

The escutcheon 166 is preferably machined from brass, but may be made of any other suitable material and process, such as cast nickel, molded plastic, and the like.

It should be appreciated that merely example embodiments of the invention have been described above. However, many modifications and variations to the example embodiments will be apparent to those skilled in the art, which will be within the spirit and scope of the invention. Therefore, the invention should not be limited to the described embodiments. To ascertain the full scope of the invention, the following claims should be referenced.

What is claimed is:

1. A diverter coupling assembly for a plumbing fitting, comprising:
   a lower adaptor defining a lower passageway housing a diverter;
   an upper adaptor coupled to the lower adaptor defining an upper passageway in fluid communication with the lower passageway, the upper adaptor including an annular recess;
   a collar axially restrained in the annular recess for receiving a fastener; and
   a spout coupled to one of the upper adaptor or lower adaptor;
   wherein the upper adaptor axially restrains the diverter in the lower passageway.

2. The diverter coupling assembly of claim 1, wherein the spout engages the upper adaptor so that the fastener couples the spout to the collar of the upper adaptor.

3. A spout coupling assembly, comprising:
   an adaptor defining a passageway from an inlet to an outlet;
   an exterior recess formed in the adaptor;
   a collar axially restrained in the exterior recess of the adaptor; and
   a spout coupled to the collar so that the spout and collar rotate substantially simultaneously;
   wherein the collar is a c-shaped collar having an insert for coupling the spout and wherein the insert is a rectangular nut having a pair of spaced apart threaded holes for engaging a pair of screws inserted through a pair of holes formed in the spout to capture the spout between the nut and the screws.

4. The spout coupling assembly of claim 3, wherein the collar is sized to abut an inner surface of the spout.

5. A spout coupling assembly, comprising:
   a lower adaptor defining a lower passageway in fluid communication with a fluid supply for housing a diverter;
   an upper adaptor coupled to the lower adaptor defining an upper passageway in fluid communication with the lower passageway and a fluid outlet;
   an annular recess formed in the upper adaptor;
   a collar axially restrained in the annular recess of the upper adaptor; and
   a spout coupled to the collar so that the spout and collar rotate substantially in unison;
   wherein the collar is a c-shaped collar having an insert for coupling the spout to the collar, wherein the insert is a rectangular nut having a pair of spaced apart threaded holes and wherein a pair of screws inserted through a pair of holes formed in the spout couple the spout to the collar.

6. A spout coupling assembly, comprising
   a lower adaptor defining a lower passageway in fluid communication with a fluid supply for housing a diverter;
   an upper adaptor coupled to the lower adaptor defining an upper passageway in fluid communication with the lower passageway and a fluid outlet;
   an annular recess formed in the upper adaptor;
   a collar axially restrained in the annular recess of the upper adaptor; and
   a spout coupled to the collar so that the spout and collar rotate substantially in unison;
   wherein the collar is sized to abut an inner surface of the spout and wherein the lower adaptor includes an annular recess formed in an outer surface to restrain a bearing.

* * * * *